Patented Oct. 10, 1922.

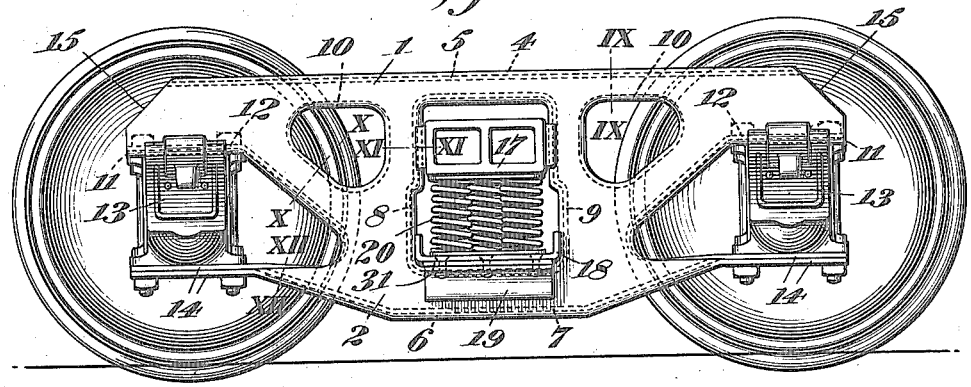

1,431,687

UNITED STATES PATENT OFFICE.

RALPH V. SAGE AND JOSEPH J. McGARRIGLE, OF PHILADELPHIA, PENNSYLVANIA.

SIDE FRAME.

Application filed April 29, 1922. Serial No. 557,419.

*To all whom it may concern:*

Be it known that we, RALPH V. SAGE and JOSEPH J. McGARRIGLE, citizens of the United States, and residents of the city of Philadelphia, in the county of Philadelphia and State of Pennsylvania, have invented certain new and useful Improvements in Side Frames; and we do hereby declare the following to be a full, clear, and exact description of the invention, such as will enable others skilled in the art to which it appertains, to make and use the same.

Our invention relates generally to trucks for railway cars, and particularly to those used with the heavier types of freight cars, and with special reference to the truck side frame and its appurtenances.

We preferably make our side frames of wrought iron or steel plates, which possess physical properties of the best character for the use intended, and by reason of the methods of their manufacture from materials of known compositions they are sure to be solid, strong and free from prejudicial defects and of physical and chemical properties best adapted to serve the severe use intended.

Our truck side frame is preferably made of two integral plates, each of which is first formed or rolled flat, then punched out in a blanking shear so that each part or member shall be of the size, proportion and contour necessary to produce the finished form, then these plates are preferably heated and flanged in a flanging press. The two sides of the frame are so flanged that some of the flanges of one side may be nested wholly within and between the flanges of the opposite side, or one may have one flange overlapping the companion flange of the other side, and the other flange of the same member may similarly overlap the corresponding flange of the other side. After the two sides are cut and flanged they are nested together with certain of their flanges overlapping and contiguous, and the outer or exposed edges of some of the flanges may be welded by an oxacetylene flame or by an electric welder, preferably of the arc type, either with or without the use of added material of similar composition, these edges being thus welded to the contiguous parts of the other side. All the outer edges of the flanges may be so welded, and we may also weld the edges of certain of the flanges which are within the channel shaped members and accessible for welding purposes. We may, however, omit the interior welding, as the construction can be made amply strong without it, or we may weld the same only in spots or at intervals as desired. We may also weld the entire lengths of the outer exposed edges of the flanges, or may also weld these only at intervals as may be preferred, or we may omit the welding and secure the parts together otherwise.

Our truck side frame is of what is known as the integral arch bar type, provided with members corresponding to the top arch bar, the bottom arch bar, the diagonally inclined portions of the bottom arch bar which extend to and are integrally joined with the top arch bar to form the end portions which are adapted to rest on the tops of the usual journal boxes, and are secured thereto by the usual journal box bolts.

In our side frame we also prefer to make the pedestal tie bars integral with the other portions of the frame, so that the entire construction thereof will be integral throughout and finally composed of one piece. An integral frame of this kind has many advantages as compared with those formed of many pieces by reason of the fact that there are no parts to become loose, lost or out of adjustment, thus conducing to strength, safty, ease of use, maintenance and inspection.

Our frames are provided with the usual journal boxes secured by bolts, and are secured together in pairs by means of any suitable style of spring plank provided with spring seats adapted to carry the heavy types of springs, on which the usual form of truck bolster may be supported.

In order to keep our frame as strong as possible and prevent weakening it by bolt or rivet holes, we have illustrated the spring plank provided with angles riveted in pairs to its end portions and projecting downwardly and fitting on each side of the central portion of the lower arch bar member of the frame, without any holes in the frame itself, which would tend to weaken it. Our truck side frame is also formed with the usual bolster guides and bolster and spring opening.

Under certain conditions we may corrugate some of the flanges which are nested together so that when the two sides are pressed together the corrugations will interlock and serve to stiffen the construction and at the same time hold the parts together more firmly, and this may also obviate or reduce the amount of welding required. The end portions and other portions may also be stiffened by other corrugations if desired.

Having thus given a general description of our invention, we will now, in order to make the matter more clear, refer to the annexed sheet of drawings, which forms part of this specification, and in which like characters refer to like parts:

Figure 1 is a side elevation of a railway truck provided with a side frame embodying our invention; Figure 2 is a side elevation of the end portion of our frame showing a modification, including two vertical corrugations in its end over the journal box to stiffen that part; Figure 3 is a top plan view of our side frame; Figure 4 is a section of an alternate form taken centrally through the top arch bar portion of our side frame over the bolster, showing as a modification the longitudinal corrugations in the horizontal flanges of the two side frame members; Figure 5 is a side elevation of the end portion of our side frame showing the modification of three vertical corrugations in its side over the journal box; Figure 6 is a side elevation of the end portion of our side frame showing another modification, including one vertical corrugation in its side over the journal box; Figure 7 is an end elevation of the side frame of Figures 1 and 3; Figure 8 is a central vertical transverse sectional elevation of the side frame of Figures 1 and 3, taken on the line VIII—VIII of Figure 3; Figure 9 is a transverse section of the top arch bar taken on the line IX—IX of Figure 1; Figure 10 is a transverse section of the inclined portion of the frame or extension of the bottom arch bar taken on the line X—X of Figure 1; Figure 11 is a transverse section through one of the columns taken on the line XI—XI of Figure 1; Figure 12 is a transverse section through one of the tie bars taken on the line XII—XII of Figure 1; Figure 13 is a vertical transverse sectional elevation taken centrally through a modified form of our improved frame showing the flanges of the side frame members nested together in a manner different from the arrangement shown in Figures 7 and 8, namely:—the flanges of one member of one portion each similarly overlap the corresponding flanges of the other portion, while as illustrated in Figures 7 and 8 both flanges of one portion are between those of the other portion; Figure 14 is a vertical transverse section through our side frame taken on the line VIII—VIII of Figure 3, but showing a modification comprising longitudinal corrugations in the horizontal flanges of the top and bottom arch bar members.

Referring now to the characters of reference on the drawings:—1 indicates our truck side frame as a whole, 2 is the outer member thereof, and 3 is the inner member, although if desired the frame could be turned around the other way, so that either side may be out, but we prefer to arrange it as shown, as it presents a better and smoother appearance as it is generally viewed from the outside. Each of these members is composed of one integral plate, which is preferably sheared or punched into the form of a blank with sufficient material from which to form the flanges and then preferably heated and pressed to the shapes shown.

As illustrated in Figures 1, 2, 3, 4, 5, 6, 7 and 8, the flanges of the outer member are spaced a greater distance apart than those of the inner member, so that the flanges of the inner member may be inserted between and contiguous to the flanges of the outer member in nesting and assembling the two parts.

The upper flange of the top arch bar of the outer member is 4 and that of the inner member is 5, while the lower flange of the bottom arch bar of the outer member is 6, and that of the inner member is 7. 8 is the outer flange of the outer member 2 adjacent the central bolster and spring opening of the frame; 9 is the flange on the inner member adjacent thereto, while 10 are the inwardly extending flanges around the other openings in the side portions. 11 is the lower flange of the outer member 2 at the end portions over the journal boxes, while 12 is the flange of the inner member 3 contiguous thereto. The journal boxes are 13 and the tie bar extensions are 14, these being shown of double thickness with flat end portions, one of the thicknesses being part of the side member and the other of the other side portion, and the contiguous edges of these may be welded together if desired.

As illustrated in Figures 1 and 6, 15 are the beveled end portions of the side frame which serve to improve the appearance and provide easy access to the journal box bolt heads, while at the same time save a little weight.

After the two portions of the frame are nested together as illustrated, the outer exposed edges of all or some of the flanges may be welded to the contiguous portions of the other member, as illustrated at 16. Certain of the flanges whose inner edges are within the open box-shaped members may also be welded to adjacent portions of the other member as illustrated by the interior figures 16 in Figures 9, 10 and 11, as these members are provided with openings so located and of size sufficient to allow the introduction of the welding apparatus within these partially closed sections. This interior welding may, however, be dispensed with if desired, and the exterior welding may either be continuous or only done at certain locations as desired. The bolster is 17, which may be of any of the usual types, and 18 is the spring plank shown of pressed plate section having pairs of stop angles 19 riveted thereto as shown and spaced apart so that their lower legs fit closely against the central part of the bottom arch bar portion as illustrated, and no other means are shown for securing these to the frame, as the fit and contact are deemed sufficient. 20 are the spiral springs, which may, however, be of any form desired.

Either one, two or three corrugations 21 may be provided in the sides of the end portions as illustrated particularly in Figures 2, 5 and 6. These corrugations will serve to stiffen and strengthen these parts of the construction to carry the loads to which they are subjected.

As illustrated in Figures 4 and 14, 22 are the longitudinal corrugations formed in the flanges of the side frame members, so arranged that when these members are nested together the corrugations will assist in holding them in position, and these corrugations, particularly in the top arch bar member, will add to its strength in resisting the compressive stresses.

Referring now to the arrangement illustrated in Figure 13, 23 is the outer portion of the side frame, 25 is the upper flange thereof which underlies the upper flange 28 of the inner member 24; 26 is the lower flange of the outer portion 23 which overlaps the lower flange 29 of the inner portion 24. 27 is the flange of the outer member 23 adjacent the central opening of the frame, and 30 is the upper flange of the bottom arch bar portion of the member 24.

A reinforcing plate 31 is provided under the ends of the spring plank, and 32 are square holes in the upper end portion of the frame to permit the heads of the column bolts to pass therethrough in assembling and disassembling.

As illustrated in Figure 13, 23 has been called the outer member of the frame and 24 the inner member, but it should be understood that this frame may be turned around, in which case the outer member would become the inner member and vice-versa.

Our construction may be stated to be a substantially integral one-piece truck side frame, composed of two plate portions each having integral projecting flanges adapted to be nested together with certain of their flanges overlapping and contiguous to form closed-box sections and other flanges abutting or opposite each other and preferably spaced apart a short distance to form open-box sections. The pedestal tie bars are also made integral with our frame, and after the parts are welded in different places as may be desired, the structure can be said to be composed of one integral piece. The size and proportion of the different parts are so arranged that each one is of the size proper to carry the stresses due to the loads and impacts to which it is subjected in use.

The two portions of the side frame, namely, the outside portion 2 and the inside portion 3, may be considered, generally speaking, as halves of the frame before they are nested and secured together, although in reality they are not exact duplicates of each other, as in the case of the design illustrated in Figures 1, 3, 7, 8 and 14, the flanges of the members of one portion are closer together than the corresponding flanges of the other portion, so that both of the adjacent flanges of one portion may be inserted between the corresponding flanges of the other portion, whereas in the style of construction illustrated in Figure 13 the two portions are more nearly similar, but even these are not exact duplicates by reason of the fact that certain of the flanges overlap those of the adjacent member on the same side, while to avoid interference of the flanges when nesting the other ones are on the other sides of the flanges of the contiguous member, as may be seen by referring to the drawings.

By reason of the integral construction of our complete side frame all of the parts thereof will operate together in harmony to withstand the loads and impacts of use, and by reason of the fact that the side portions or side plates are spaced a considerable distance apart, the construction is very well adapted to withstand the lateral stresses of use as well as the more nearly vertical ones.

Although we have shown and described our invention in considerable detail, we do not wish to be limited to the exact and specific details thereof as shown and described, but may use such modifications in, substitutions for, or equivalents thereof as are embraced within the scope of our invention, or as pointed out in the claims.

Having thus described our invention, what we claim and desire to secure by Letters Patent is:

1. A truck side frame composed of a pair of metal plates provided with inwardly extending integral flanges nested together with their flanges contiguous and secured thereto.

2. An integral side frame comprising a pair of plates, each provided with integral flanges projecting inwardly and forming parts of the supporting members, said plates being nested together with portions of their flanges overlapping each other and secured thereto.

3. An integral side frame comprising a pair of plates, each provided with integral flanges projecting inwardly and forming parts of the supporting members, said plates being nested together with portions of their flanges overlapping, and other portions having flanges opposite in substantial alignment with each other.

4. A side frame comprising a pair of plates, each provided with integral flanges projecting inwardly and forming parts of the supporting member, said plates being nested together with portions of their flanges overlapping, and other portions having flanges in substantial alignment with each other, with their edges spaced apart.

5. A side frame comprising a pair of plates provided with integral flanges extending inwardy from various members thereof, the flanges of certain members of one plate being nested against and contiguous to those of the other plate and secured thereto.

6. A side frame comprising a pair of plates with integral flanges extending inwardly from various members thereof, the flanges of certain members of one plate being nested against and contiguous to those of the other plate and secured thereto, the flanges of the other portions being opposite and shorter.

7. A side frame comprising a pair of plates provided with integral flanges extending inwardly from various members thereof, the flanges of other portions being shorter and opposite each other with their edges spaced apart, said flanges of certain members of one plate being nested against and contiguous to those of the other plate and secured thereto by their edges.

8. In a truck side frame, a pair of plates provided with integral inwardly extending flanges nested together with some of their flanges contiguous, the flanges of the members comprising the top and bottom arch bars, being provided with longitudinal corrugations adapted to interlock when nested together.

9. A truck side frame, comprising a pair of plates, each provided with integral inwardly projecting flanges, some of which are adapted to overlap corresponding flanges of the other plate, and secured together by welding the edges of said flanges to the contiguous portions of the other member, whereby an integral construction is provided.

10. A truck side frame, comprising a pair of plates with flanges projecting at an angle therefrom, said plates being nested together with certain of their flanges contiguous, and secured to the other plate by welding, and one or more vertical corrugations formed in the sides of the portions over the journal boxes.

11. An arch-bar form of truck side frame, comprising a pair of plates, the bottom arch bar and the central portion of the top arch bar, the lower portion of the inclined side members and the portions over the journal boxes being provided with flanges which are adapted to overlap each other with their edges secured to the adjacent parts by welding, the portions surrounding the bolster opening having similarly overlapped flanges and openings between the column guides and end of the truck, surrounded by members provided with integral flanges opposite each other, with their adjacent edges slightly spaced apart.

In witness whereof we hereunto affix our signatures.

RALPH V. SAGE.
JOSEPH J. McGARRIGLE.